(12) United States Patent
Machida

(10) Patent No.: US 6,739,296 B2
(45) Date of Patent: May 25, 2004

(54) APPARATUS AND METHOD FOR CONTROLLING VARIABLE VALVE OPERATING MECHANISM

(75) Inventor: Kenichi Machida, Atsugi (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 10/101,413

(22) Filed: Mar. 20, 2002

(65) Prior Publication Data

US 2002/0139329 A1 Oct. 3, 2002

(30) Foreign Application Priority Data

Mar. 27, 2001 (JP) ........................................ 2001-090972

(51) Int. Cl.$^7$ ................................................. F01L 1/34
(52) U.S. Cl. .................................. 123/90.16; 123/90.15
(58) Field of Search ........................... 123/90.15, 90.16, 123/90.17, 90.11, 90.12

(56) References Cited

U.S. PATENT DOCUMENTS

| | | | |
|---|---|---|---|
| 5,694,912 A | * | 12/1997 | Gotou et al. ................ 123/674 |
| 5,913,298 A | * | 6/1999 | Yoshikawa ................... 123/306 |
| 5,934,231 A | * | 8/1999 | Schmitz et al. ........... 123/90.11 |
| 5,957,096 A | * | 9/1999 | Clarke et al. ............. 123/90.15 |
| 6,230,675 B1 | * | 5/2001 | Kobayashi et al. ....... 123/90.15 |
| 6,318,313 B1 | * | 11/2001 | Moriya et al. ........... 123/90.15 |

FOREIGN PATENT DOCUMENTS

| | | | | |
|---|---|---|---|---|
| JP | 61085516 A | * | 5/1986 | .......... F01L/13/00 |
| JP | 2000-328971 | | 11/2000 | |

* cited by examiner

*Primary Examiner*—Thomas Denion
*Assistant Examiner*—Jaime Corrigan
(74) *Attorney, Agent, or Firm*—Foley & Lardner LLP

(57) ABSTRACT

In an internal combustion engine equipped with a variable valve operating mechanism that performs a valve timing control and a valve lift amount control of at least one of an intake valve and an exhaust valve, target values of the valve timing and the valve lift amount set based on an engine operating condition are limited by a limit value to limit a control range of one of the valve timing and the valve lift amount in accordance with a control state of the other of the valve timing and the valve lift amount, so that the valve timing and the valve lift amount are controlled based on the respective target values one of which has been limited as above.

22 Claims, 9 Drawing Sheets

APPARATUS AND METHOD FOR CONTROLLING VARIABLE VALVE OPERATING MECHANISM

FIELD OF THE INVENTION

The present invention relates to a control technology of a variable valve operating mechanism that performs a valve timing control and a valve lift amount control, independently, of at least one of an intake valve and an exhaust valve.

RELATED ART OF THE INVENTION

There have been practically used various kinds of variable valve operating mechanisms that control valve timing or a valve lift amount of an intake valve or an exhaust valve to an optimal control amount.

In order to further improve power and exhaust gas purification performance of an engine, there has been developed a mechanism that variably controls both of valve timing and a valve lift amount of an intake valve or an exhaust valve.

In Japanese Unexamined Patent Publication 2000-328971, a valve timing (opening and closing timing) variable mechanism and a valve characteristic switching mechanism of an intake valve are disposed together at an intake side camshaft, so that both of valve timing and a valve lift amount of the intake valve can be changed, thereby variably controlling the valve timing and the valve lift amount for each operating region determined based on a rotation speed and load of an engine.

The above conventional variable valve operating mechanism performs the valve timing control and valve lift amount control of the intake valve independently, and each control range is set so that the engine performance (operating performance, exhaust gas purification performance and the like) can be increased to a maximum depending on each control characteristic. However, in a case where the valve timing control and the valve lift amount control are performed together, for example in a partially loaded medium speed region, if the valve timing is controlled to an advance angle side and the valve lift amount is controlled to a large lift amount side, respectively, the valve lift amount in the vicinity of the top dead center of a piston becomes extremely large, thereby possibly causing interference between the intake valve and the piston.

If a stopper and the like are used to mechanically limit a maximum advance angle value of the valve timing variable mechanism and the valve lift amount of the valve characteristic switching mechanism of the intake valve, so as to avoid an excessive increase of valve lift amount in the vicinity of the piston top dead center, the control range is narrowed. Also, in the control of the valve timing and the valve lift amount in which there is no interference between the intake valve and the piston, an upper limit of control amount is limited. Therefore, it is impossible to obtain sufficient effects due to an increase of engine power and the improvement of exhaust gas purification performance by using both of the valve timing variable control and the valve lift amount variable control of the intake valve.

Note, in such a mechanism in which a valve timing control and a valve lift amount control of an exhaust valve are performed together, if the valve timing is controlled to a retarded angle side and at the same time, the valve lift amount is controlled to a large lift amount side respectively, there is a possibility of interference between the exhaust valve and the piston, thereby causing the same problem.

SUMMARY OF THE INVENTION

The present invention has been achieved in view of the forgoing problem, and has an object for, in a variable valve operating mechanism that uses both of valve timing control and a valve lift amount control of an intake valve or an exhaust valve but performs the valve timing control and the valve lift amount control, independently, expanding as wide as possible control regions of valve timing and a valve lift amount of at least one of the intake valve and the exhaust valve, while preventing interference of the intake valve or the exhaust valve with a piston, to thereby increase the engine performance to a maximum.

In order to achieve the above object, the present invention provides an apparatus and a method for controlling a variable valve operating mechanism that performs a valve timing control and a valve lift amount control of at least one of an intake valve and an exhaust valve, wherein a control range of one of the valve timing and the valve lift amount is limited in accordance with a control state of the other.

According to the above constitution, if, regardless of the control state of one of the valve timing and the valve lift amount of the intake valve or the exhaust valve, the other is controlled in accordance with an engine operating condition and, as a result, there is caused interference of the intake valve or the exhaust valve with the piston, the interference with the piston can be prevented by limiting the control range of the other.

The other objects and features of this invention will become understood from the following description with accompanying drawings.

EMBODIMENT

An embodiment according to the present invention will be explained as follows.

Figure 1:
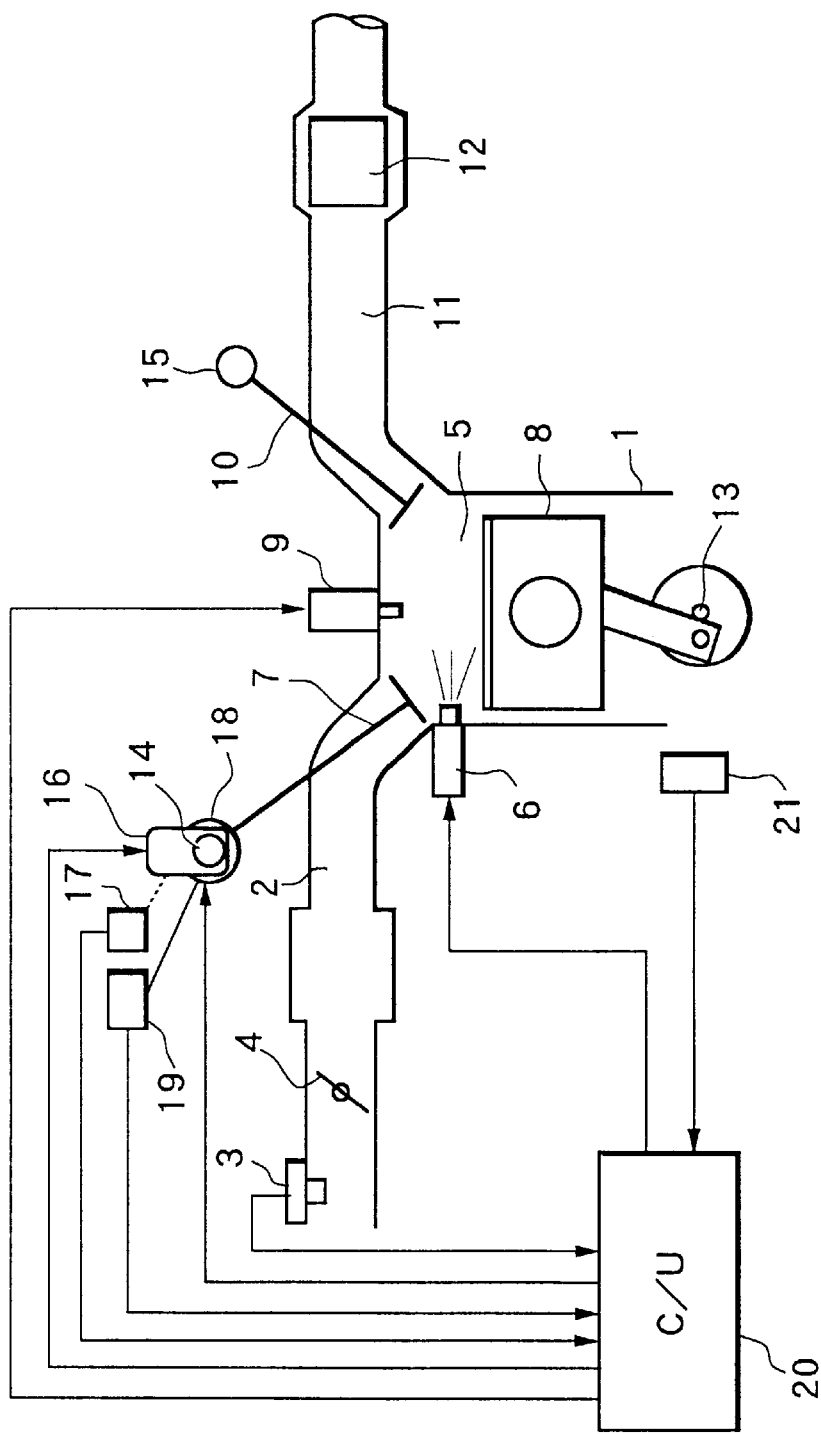
FIG. 1 is a diagram showing a system structure of an embodiment according to the present invention.

FIG. 1 is a diagram showing a system structure of an internal combustion engine equipped with a variable valve operating apparatus according to an embodiment of the present invention.

An air flow meter 3 that detects an intake air flow amount Q is disposed in an intake passage 2 of an internal combustion engine 1, and a throttle valve 4 that controls the intake air flow amount Q is disposed on the downstream side of flow meter 3.

A fuel injection valve 6 that injects fuel into a combustion chamber 5 of each cylinder downstream of intake passage 2 is disposed. A mixture of the fuel injected from fuel injection valve 6 and air drawn through an intake valve 7 from throttle valve 4 is compressed within combustion chamber 5 by a piston 8 and is ignited by spark ignition by an ignition plug 9 disposed inside combustion chamber 5.

An exhaust gas of internal combustion engine 1 is discharged to an exhaust passage 11 from combustion chamber 5 through an exhaust valve 10, to be discharged into the atmosphere through an exhaust purification catalyst 12.

Intake valve 7 and exhaust valve 10 are driven to open/close by operations of cams that are disposed respectively on an intake side camshaft 14 and an exhaust side camshaft 15, with a crankshaft 13 as a power source thereof.

On the intake side, a variable valve lift amount control apparatus 16 (hereinafter, VEL) comprising a multi-articulated link mechanism that successively performs a variable control of a valve lift amount and an operating angle of intake valve 7 is disposed on a periphery of intake side camshaft 14. VEL 16 is disposed with a VEL operating angle sensor 17 that detects the valve lift amount and the operating angle of intake valve 7. A detailed structure of VEL 16 will be described later.

Also, on the intake side, a variable valve timing mechanism (hereinafter, VTC) comprising a mechanism that successively performs a variable control of a rotation phase of intake side camshaft 14 relative to crankshaft 13, to advance/retard the valve timing of intake valve 7 (valve opening and closing timing), is disposed on one end of intake side camshaft 14. On the other end of intake side camshaft 14, an intake side cam angle sensor 19 that detects a rotation position of intake side camshaft 14 is disposed.

An engine control unit (ECU) 20 obtains an engine load and an engine rotation speed based on an intake air flow amount signal output from air flow meter 3 and a crank angle signal output from a crank angle sensor 21 that is disposed on the crankshaft 13 to detect a rotation position of crankshaft 13, and computes a fuel injection quantity, a VEL target valve lift amount, and VTC target valve timing, respectively. ECU 20 outputs a feedback control signal to the VEL based on a VEL operating angle signal output from VEL operating angle sensor 17 so that an actual VEL valve lift amount is converged to the target VEL valve lift amount. In a similar way, ECU 20 obtains actual VTC valve timing from a phase difference between an output signal from intake side cam angle sensor 19 and the crank angle signal from crank angle sensor 21, and outputs a feedback control signal to VTC 18 so that the actual VTC valve timing is converged to a target VTC angle.

Figure 2:
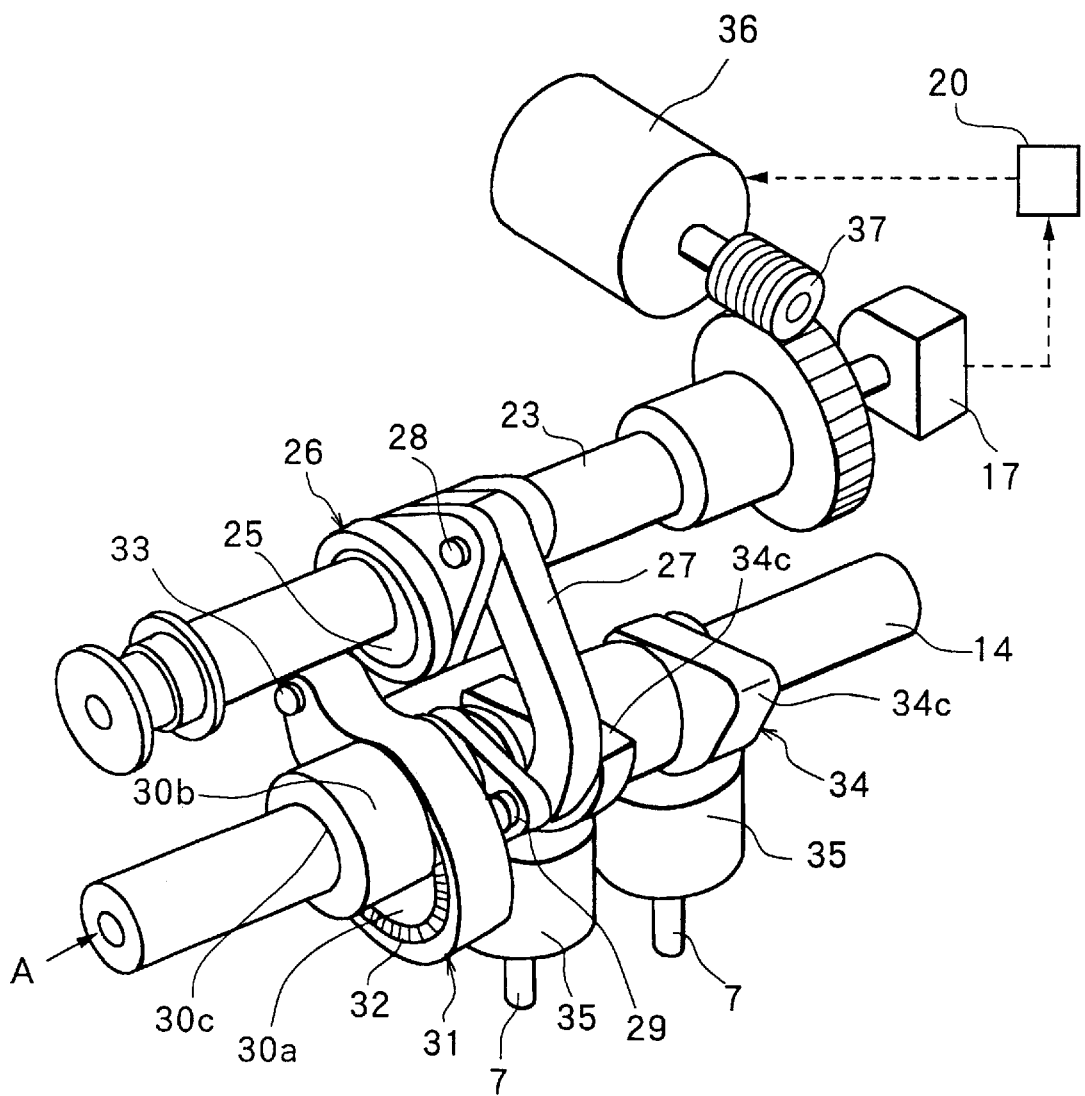
FIG. 2 is a partial perspective view of a variable valve lift amount control device to be used in the embodiment according to the invention.
Figure 3:
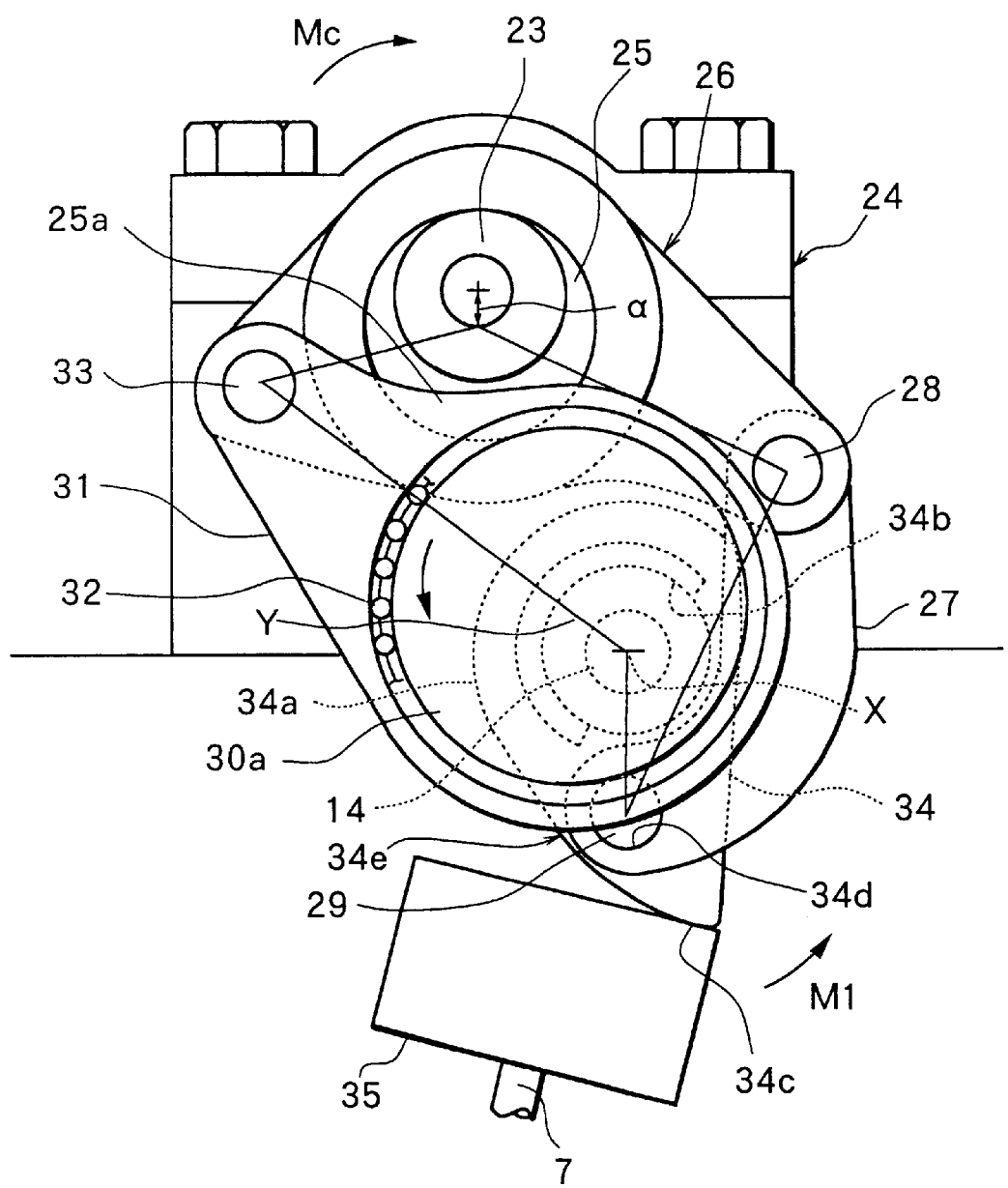
FIG. 3 is an A arrow view of FIG. 2.

Next, VEL 16 will be described based on FIG. 2 and FIG. 3.

A control shaft 23 of VEL 16 is arranged in parallel with intake side camshaft 14 and both ends thereof are supported by bearings 24 fixed to cylinder blocks not shown in the figures.

A control cam 25 is formed in a substantially cylindrical shape having an outer diameter greater than control shaft 23, and is disposed on control shaft 23 in a state where the center axis thereof is biased by a predetermined amount α from the center axis of control shaft 23.

A rocker arm 26 is formed in a substantially rhombus shape and an outer surface of control cam 25 is slidably inserted into a through hole formed on the center of rocker arm 26.

A link rod 27 is formed in a substantially crescent shape and one end thereof is rotatably connected with one end of rocker arm 26 via a pin 28 and the other end thereof is rotatably connected to a position biased from the center axis of intake side camshaft 14 via a pin 29.

A driving cam 30 comprises a cam body 30a formed in a cylindrical shape having a large outer diameter, and a cylindrical portion 30b which is formed in a cylindrical shape having a small outer diameter and is disposed adjacent to one end of cam body 30a. A shaft hole 30c is formed through the central portion of cylindrical portion 30b and intake side camshaft 14 is slidably inserted into shaft hole 30c.

The center axis of cylindrical portion 30b is coincident with the center axis X of intake side camshaft 14, but the center axis Y of cam body 30a is biased by a predetermined amount from the center axis X of intake side camshaft 14.

A link arm 31 is formed in an annular shape having a large outer diameter than driving cam 30, and a periphery of cam body 30a of driving cam 30 is slidably inserted into a hole formed passing through the central portion of link arm 31 via a bearing 32.

An end portion of link arm 31 projecting into an outer diameter direction thereof is rotatably connected to the other end of rocker arm 26 via a pin 33.

An intake cam 34 is formed in a raindrop shape and is fixed to intake side cam 14 in such a manner that intake side cam 14 is inserted into a shaft hole 34b passing through a base end 34a, on the other hand, intake cam 34 is rotatably connected to link rod 27 such that a pin hole 34d is formed through a cam nose portion 34c positioned on an end portion of intake cam 34 projecting into an outer diameter direction from base end 34a, and pin 29 is inserted into pin hole 34d.

A valve lifter 35 is formed in a cylindrical shape with a lid and a cam surface 34e of intake cam 34 is in contact with a predetermined position of an upper surface of valve lifter 35 in accordance with a swing position of intake cam 34, while intake valve 7 is fixed to a bottom portion of valve lifter 35.

An electrically operated actuator 36 has a worm gear 37 which is fixed to a driving shaft end thereof and meshes with a gear fixed to one end of control shaft 23, and rotates control shaft 23 within a fixed range by a driving signal output from ECU 20.

VEL operating sensor 17 is disposed on one end of control shaft 23, to detect a valve lift amount of VEL 16 based on a rotation amount of control shaft 23 and to output a detection signal to ECU 20.

Next, an operation principle of VEL 16 will be described.

Figure 4A:
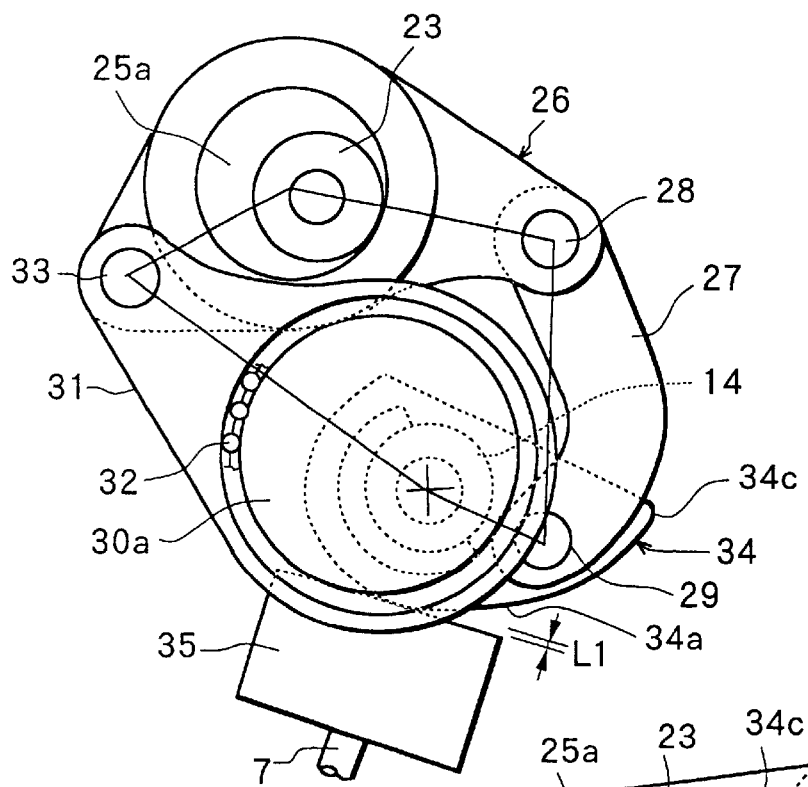
FIG. 4A is a function explanation view showing a valve opening state at a minimum lift amount of the variable valve lift amount control device.
Figure 4B:
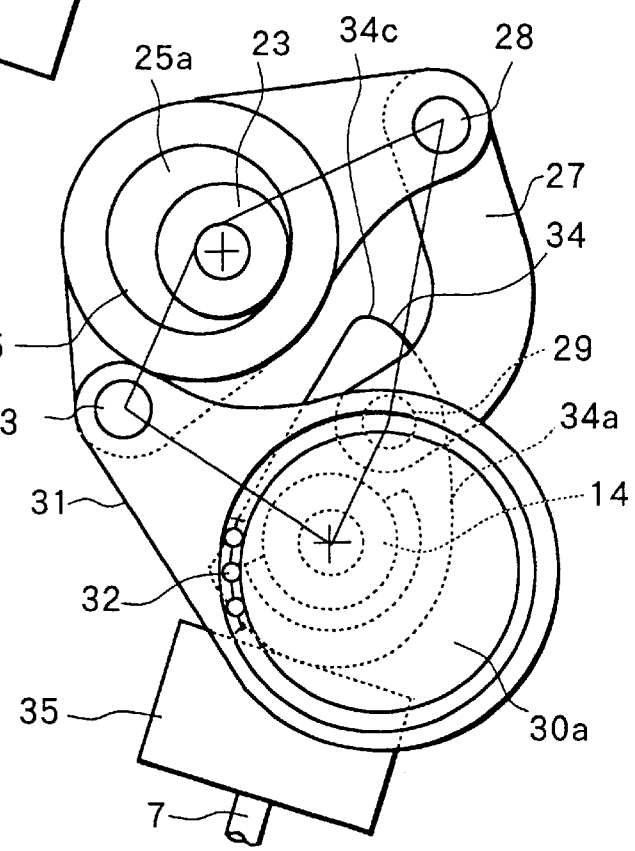
FIG. 4B is a function explanation view showing a valve closing state at the minimum lift amount of the variable valve lift amount control device.

FIG. 4A and FIG. 4B respectively show an opening state and a closing state of VEL 16 when performing a minimum lift amount control. When electrically operated actuator 36 receives a driving signal from ECU 20 to provide control shaft 23 with a clockwise rotation for controlling a lift amount to a minimum amount, a thick portion 25a of control cam 25 moves upward and in synchronization with this rocker arm 26 also moves upward. At this time, cam nose portion 34c of intake cam 34 is lifted up by link rod 27. Therefore, cam surface 34e of intake cam 34, which is in contact with valve lifter 35 by the rotation of intake side camshaft 14 gets close to base portion 34a and the valve lift amount is controlled to a small lift amount shown by L1 in FIG. 4A.

Figure 5A:
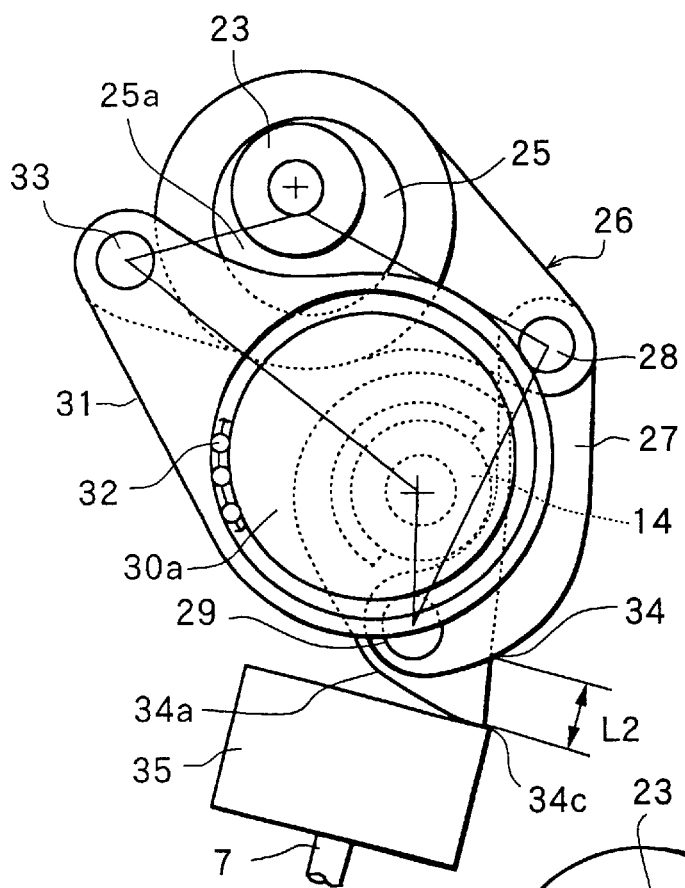
FIG. 5A is a function explanation view showing a valve opening state at a maximum lift amount of the variable valve lift amount control device.
Figure 5B:
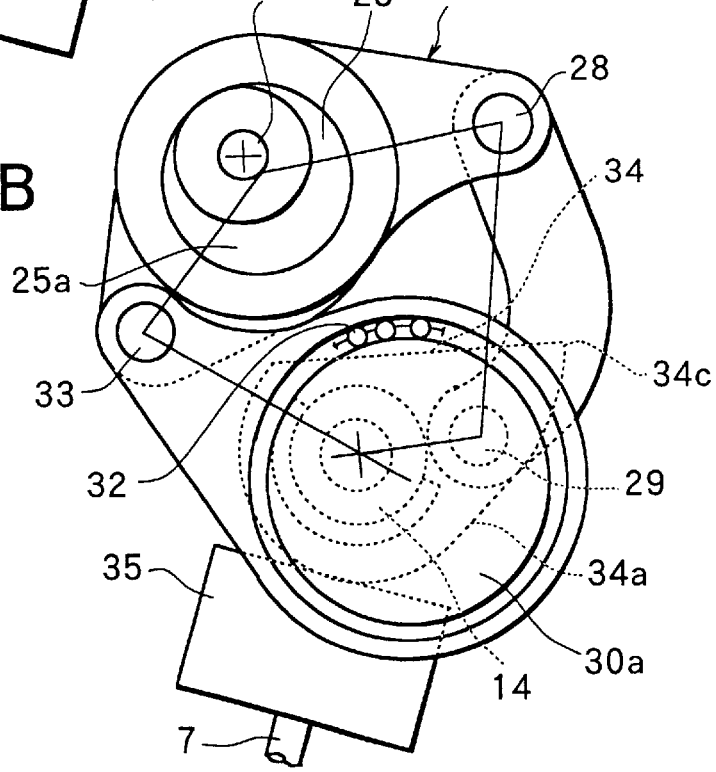
FIG. 5B is a function explanation view showing a valve closing state at the maximum lift amount of the variable valve lift amount control device.

On the other hand, FIG. 5A and FIG. 5B respectively show an opening state and a closing state of VEL 16 when performing a maximum lift amount control. When electrically operated actuator 36 receives a driving signal from ECU 20 to provide control shaft 23 with an anticlockwise rotation for controlling a lift amount to a maximum amount, thick portion 25a of control cam 25 moves downward and in synchronization with this rocker arm 26 also moves downward. At this time, cam nose portion 34c of intake cam 34 is pushed down via link rod 27. Therefore, cam surface 34e of intake cam 34, which is in contact with valve lifter 35 by the rotation of intake side camshaft 14 is positioned between a tip of cam nose portion 34c and base portion 34a, and the valve lift amount is controlled to a large amount shown by L2 in FIG. 5A.

Next, controls of VEL and VTC in a first embodiment according to the present invention will be described.

In the valve lift amount control by the VEL, a target valve lift amount is set based on an engine rotation speed Ne and a fuel injection quantity Tp, and then the control using a proportional component, an integral component, and a derivative component (to be referred to a second embodiment described later) is performed without limiting a control range so as to obtain the target valve lift amount.

Figure 6:
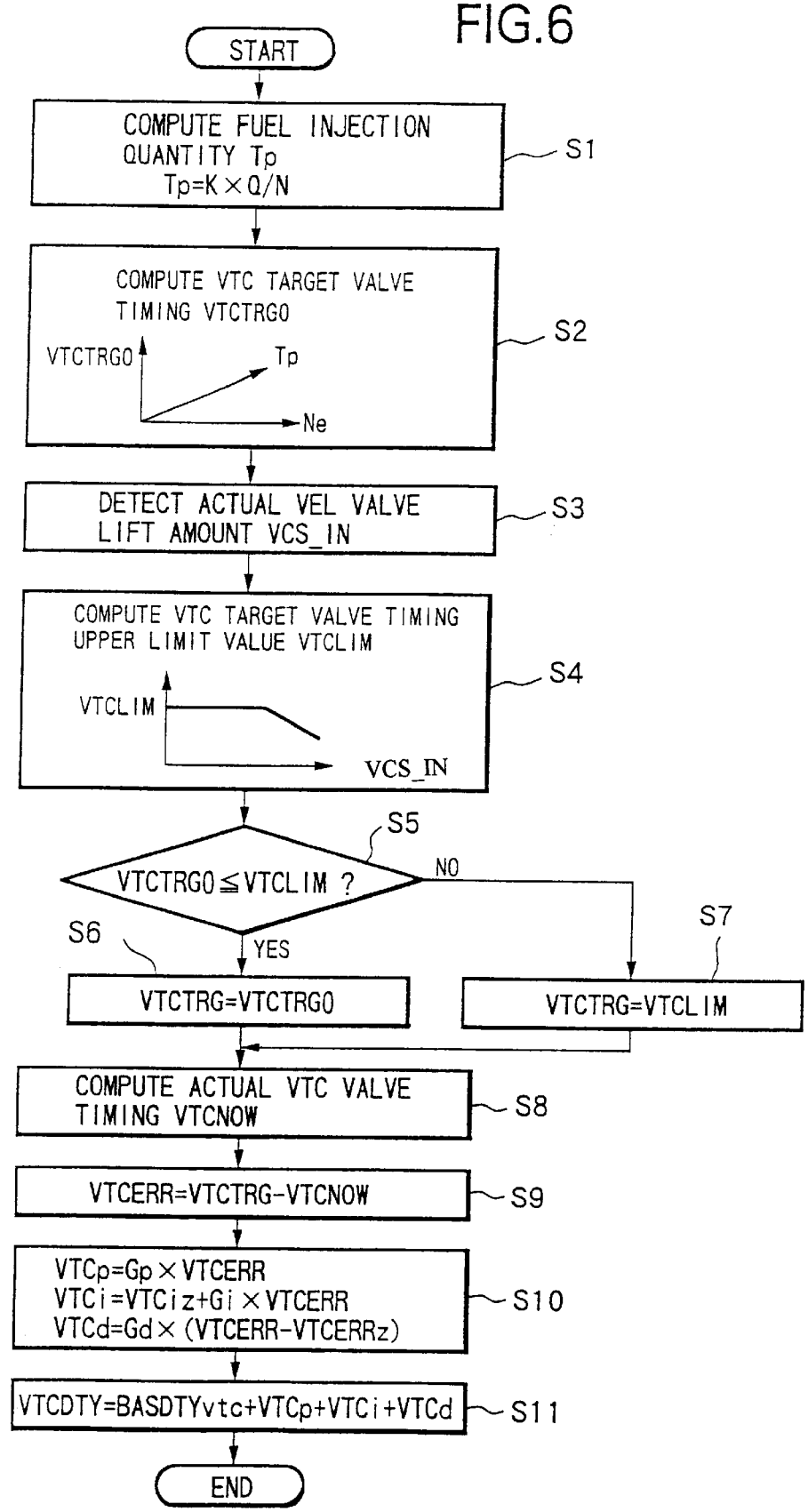
FIG. 6 is a flowchart related to a first embodiment according to the present invention.

On the other hand, the valve timing control by the VTC is performed in accordance with a control state by the VEL of the valve lift amount, while limiting the control range, so that intake valve 7 does not interfere with the piston. The control operation by the VTC will be described based on a flowchart in FIG. 6.

At Step 1 (to be abbreviated as S1 in the figure and the same rule will be applied to the followings), a fuel injection quantity Tp (=K·Q/Ne: K is constant) is computed based on the intake air amount Q detected by air flow meter 3 and the engine rotation speed Ne detected by crank angle sensor 13.

At Step 2, based on the fuel injection quantity Tp and the engine rotation speed Ne computed at Step 1, a target valve timing VTCTRG0 of VTC 18 is computed from a table stored in advance.

At Step 3, an actual VEL valve lift amount VCS_IN of VEL 16 is obtained from a detection signal from VEL operating angle sensor 17.

At Step 4, based on the detected actual VEL valve lift amount VCS_IN, a VTC target valve timing upper limit value VTCLIM is computed from a table stored in advance.

The VTC target valve timing upper limit value VTCLIM is set to be the same as the most advance angle position regulated by a stopper mechanism of VTC 18, because there is no possibility of interference between intake valve 7 and piston 8 even if VTC 18 is controlled to the most advance angle position, in a case where the valve lift amount of intake valve 7 is in a region of from a low lift amount to an intermediate lift amount.

On the other hand, if the valve lift amount of intake valve 7 becomes in a region of a high lift amount, with VTC 18 approaching the most advance angle position, there is caused a possibility of interference between intake valve 7 and piston 8 at the piston top dead center. Therefore, in a region of from the intermediate lift amount to the high lift amount, the VTC target valve timing upper limit value VTCLIM is gradually set to a retarded angle side.

At Step 5, the VTC target valve timing VTCTRG0 obtained at Step 2 and the VTC target valve timing upper limit value VTCLIM obtained at Step 4 are compared with each other. When the VTC target valve timing VTCTRG0 is equal to or less than the VTC target valve timing upper limit value VTCLIM, control proceeds to Step 6, while when the VTC target valve timing VTCTRG0 is more than the VTC target valve timing upper limit value VTCLIM, control proceeds to Step 7.

At Step 6, the VTC target valve timing VTCTRG0 referred from the table of Step 2 is determined as a final VTC target valve timing VTCTRG.

At Step 7, instead of the VTC target valve timing VTCTRG0 referred from the table of Step 2, the VTC target valve timing upper limit value VTCLIM obtained at Step 4 is determined as a final VTC target valve timing VTCTRG.

At Step 8, an actual VTC valve timing VTCNOW is obtained based on a detection signal from crank angle sensor 21 and a detection signal from intake side cam angle sensor 19.

At Step 9, a deviation VTCERR between the VTC target valve timing VTCTRG and the actual VTC valve timing VTCNOW determined at Step 6 and Step 7, respectively, is computed.

At Step 10, based on the deviation VTCERR determined at Step 9, and feedback gains Gp (proportional component), Gi (integral component) and Gd (derivative component), a proportional component control amount VTCp, an integral component control amount VTCi, and a derivative component control amount VTCd are respectively obtained by the following equations:

$VTCp = Gp \cdot VTCERR;$ $VTCi = VTCiz + Gi \cdot VTCERR;$ and $VTCd = Gd \cdot (VTCERR - VTCERRz),$ wherein VTCiz: previsous value of the integral component control amount VTCi; and VTCERRz: previous value of the deviation VTCERR.

At Step 11, a VTC duty value VTCDTY is computed based on a value obtained by adding a basic duty value BASDTYvtc, and the control amounts VTCp, VTCi and VTCd, and then the computed VTC duty value VTCDTY is output as an output signal to drive the actuator of VTC 18 and control is ended.

The controls of VEL and VTC in a second embodiment according to the present invention will be described.

In the valve timing control by the VTC, a target valve timing is set based on an engine rotation speed Ne and a fuel injection quantity Tp, and then the control using a proportional component, an integral component, and a derivative component (to be referred to the first embodiment described above) is performed without limiting a control range so as to obtain the target valve timing.

Figure 7:
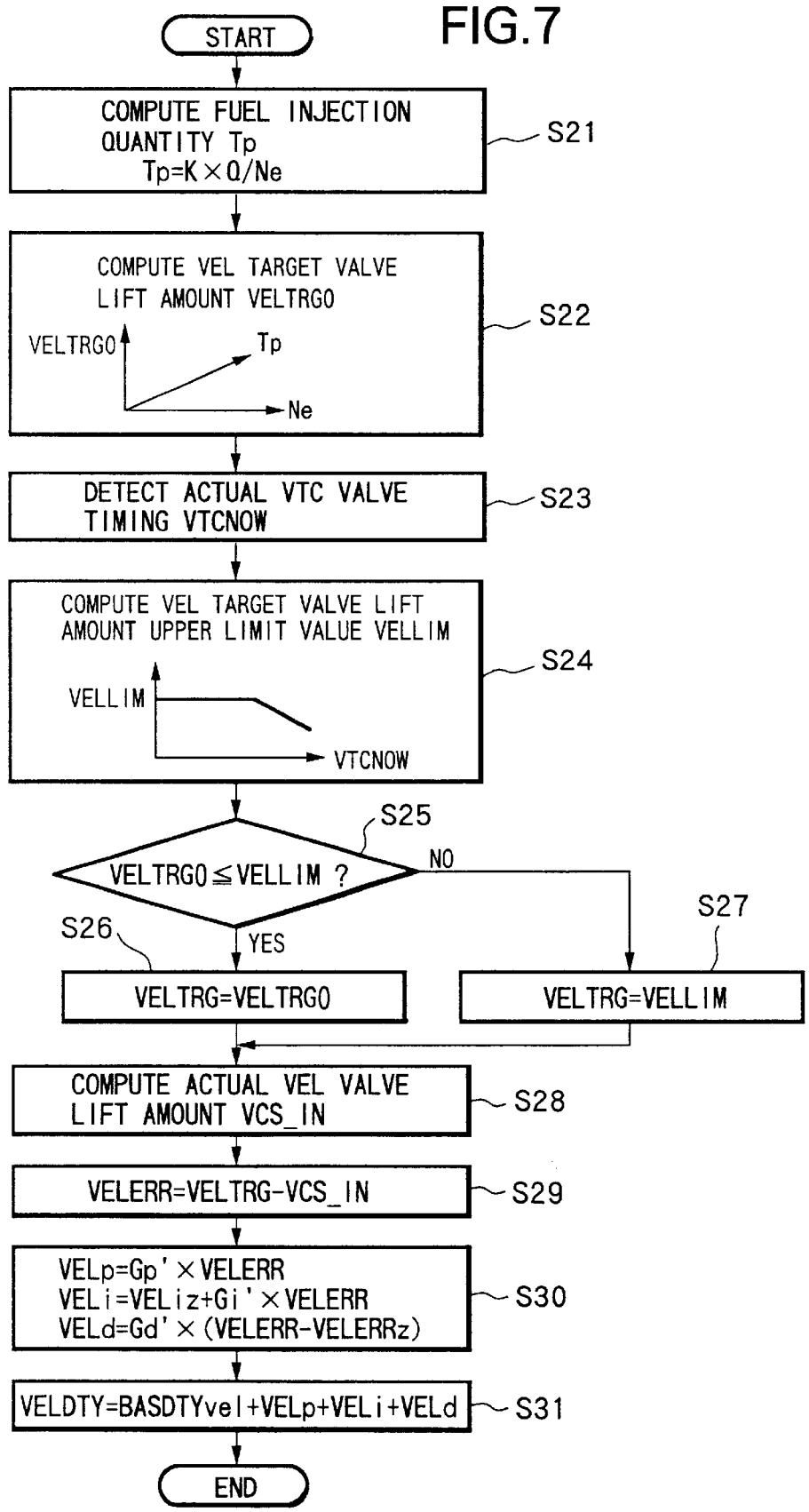
FIG. 7 is a flowchart related to a second embodiment according to the present invention.

On the other hand, the valve lift amount control by the VEL is performed in accordance with a control state by the VTC of the valve timing, while limiting the control range, so that intake valve 7 does not interfere with the piston. The control operation by the VEL will be described based on a flowchart in FIG. 7.

At Step 21, a fuel injection quantity Tp is computed based on an intake air amount Q and an engine rotation speed Ne in the same manner as at Step 1.

At Step 22, a target valve lift amount of VEL 16 is obtained based on the fuel injection Tp and the engine rotation speed Ne from a table stored in advance, in the same manner as in the computation of VTC target valve timing of VTC 18 at Step 2.

At Step 23, an actual VTC valve timing VTCNOW is obtained from a phase difference between an output signal from crank angle sensor 21 and an output signal from intake side cam angle sensor 19.

At Step 24, a VEL target valve lift amount upper limit value VELLIM is computed based on the VTC valve timing VTCNOW obtained at Step 23. As in the first embodiment, when the actual VTC valve timing is controlled to an advance angle side and also the valve lift amount is controlled to a high lift amount side, there is a possibility of interference between intake valve 7 and piston 8 at the piston top dead center. Therefore, in this embodiment, in a case where the actual VTC valve timing is in a range of from an intermediate advance angle amount to a most advance angle amount, with the displacement of valve timing to the advance angle side, the target valve lift amount is gradually controlled to a lower valve lift amount side.

At Step 25, the target valve lift amount VELTRG0 obtained at Step 22 and the VEL valve lift amount upper limit value VELLIM obtained at Step 24 are compared with each other. When the VEL target valve lift amount VEL-TRG0 is equal to or less than the VEL valve lift amount upper limit value VELLIM, control proceeds to Step 26, while when the VEL target valve lift amount VELTRG0 is more than the VEL valve lift amount upper limit value VELLIM, control proceeds to Step 27.

At Step 26, the VEL target valve lift amount VELTRG0 referred from the table of Step 22 is set as a final VEL target valve lift amount VELTRG.

On the other hand, at Step 27, instead of the VEL target valve lift amount VELTRG0 referred from the table of Step 22, the VEL target valve lift amount upper limit value VELLIM obtained at Step 24 is set as a final VEL target lift amount VELTRG.

At Step 28, an actual VEL valve lift amount VCS_IN is obtained based on a detection signal from VEL operating angle sensor 17.

At Step 29, a deviation VELERR between the VEL target valve lift amount VELTRG and the actual VEL valve lift amount VCS_IN determined at Step 26 and at Step 28, respectively, is computed.

At Step 30, a proportional component control amount VELp, an integral component control amount VELi, and a derivative component control amount VELd are respectively obtained based on the deviation VELERR determined at Step 29, and feedback gains Gp' (proportional component, Gi' (integral component) and Gd' (derivative component) by the following equations:

$VELp = Gp' \cdot VELERR;$ $VELi = VELiz + Gi' \cdot VELERR;$ and $VELd = Gd' \cdot (VELERR - VELERRz),$ wherein VELiz: previous value of the integral component control amount VELi; and
VELERRz: previous value of the deviation VELERR.

At Step 31, a VEL duty value VELDTY is computed based on a value obtained by adding a basic duty value BASDTYvel and the control amounts VELp, VELi and VELd, and then the computed VEL duty value VELDTY is output as an output signal to drive an electrically operated motor 45 of VEL 16 and control is ended.

According to the first and second embodiments, in the region where the VEL is in a high valve lift amount and also the VTC is at the most advance angle, the interference between intake valve 7 and piston 8 at the piston top dead center is suppressed, by limiting one of the control amounts of the valve lift amount and of the valve timing, and in the region other than the above, an operation range is ensured up to the most advance angle amount and the highest valve lift respectively mechanically permitted. Thus, it becomes possible to achieve, in every operating condition, the improvement of the output power and exhaust gas purification performance of the engine.

In these embodiments, only the control amount of either the valve lift amount or the valve timing is limited, but the constitution can be such that the control range of the valve lift amount is limited in accordance with a control state of the valve timing, and also the control range of the valve timing is limited in accordance with a control state of the valve lift amount. A third embodiment in which both of the control ranges of the valve timing and valve lift amount will be described hereunder.

Figure 8:
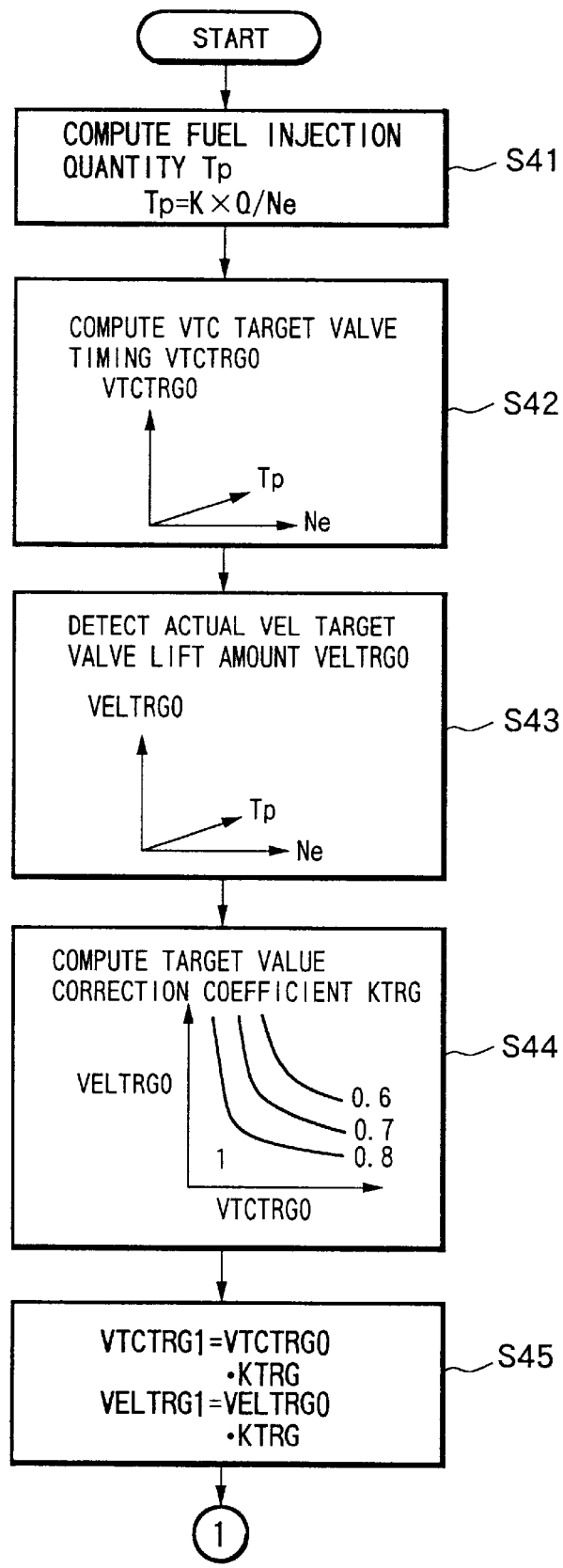
FIG. 8 is a former part of a flowchart related to a third embodiment according to the present invention.
Figure 9:
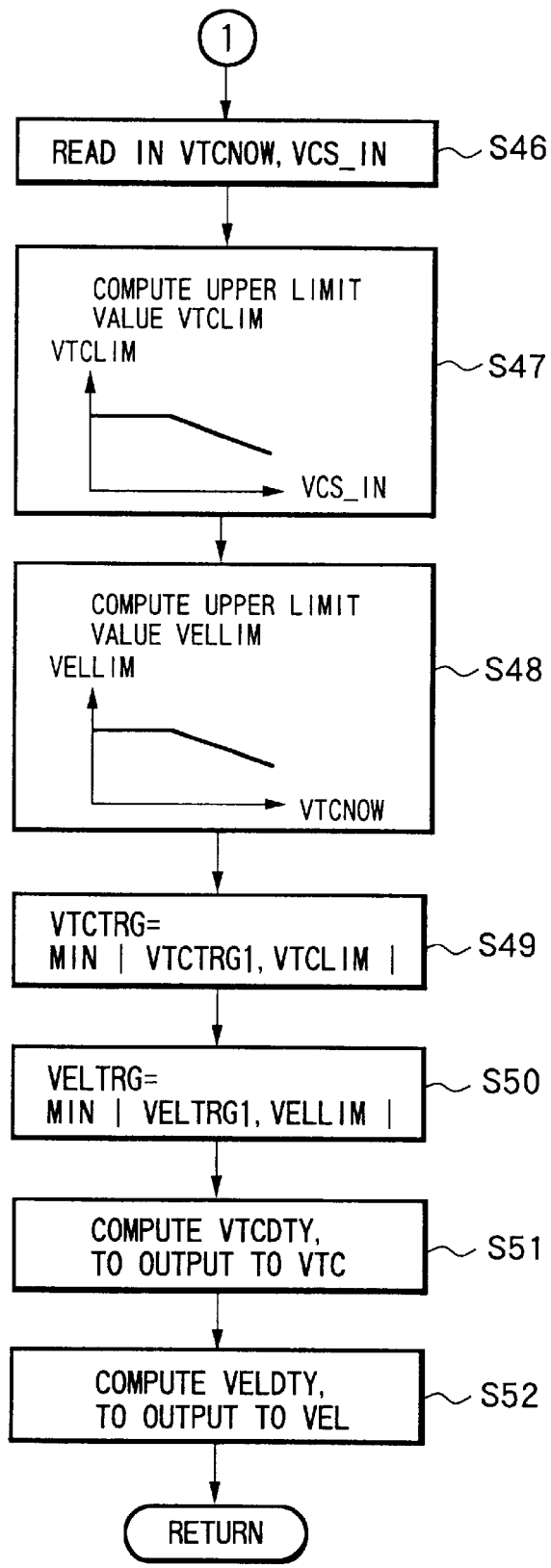
FIG. 9 is a latter part of the flowchart related to the third embodiment according to the present invention.

FIG. 8 and FIG. 9 show a flowchart of a control in the third embodiment.

At Step 41, a fuel injection quantity Tp is set in the same manner as above, and VTC target valve timing VTCTRG0 and a VEL target valve lift amount VELTRG0 are computed based on an engine rotation speed Ne and the fuel injection quantity Tp, respectively, at Step 42 and at Step 43.

At Step 44, a target value correction coefficient KTRG is referred from a map shown in the figures based on the VTC target valve timing VTCTRG0 and the VEL target valve lift amount VELTRG0.

At Step 45, the VTC target valve timing VTCTRG0 and the VEL target valve lift amount VELTRG0 are respectively corrected with a value obtained by multiplying the target value correction coefficient KTRG (<1) to obtain VTC target valve timing VTCTRG1 and a VEL target valve lift amount VELTRG1.

The target value correction coefficient KTRG is set to a value capable of preventing interference between an intake valve and a piston, by correcting the VTC target valve timing VTCTRG0 and the VEL target valve lift amount VELTRG0 with the target value correction coefficient KTRG (<1), in the region where there is caused the interference between the intake valve and the piston when the actual valve timing and valve lift amount are controlled to the VTC target valve timing VTCTRG0 and the VEL target valve lift amount VELTRG0. In a region where there is no interference between the intake valve and the piston caused by the VTC target valve timing VTCTRG0 and the VEL target valve lift amount VELTRG0, the target value correction coefficient KTRG is set to 1 and no correction is made to the VTC target valve timing VTCTRG0 and the VEL target valve lift amount VELTRG0. Further, the target value correction coefficient KTRG may be set separately for the correction of the VTC target valve timing VTCTRG0 and for the correction of the VEL target valve lift amount VELTRG0. In a partial region, the target value correction coefficient KTRG may be set for only the correction of either the VTC target valve timing VTCTRG0 or the VEL target valve lift amount VELTRG0.

At Step 46, an actual VTC valve timing VTCNOW and an actual VEL valve lift amount VCS_IN are read on.

At Step 47 and at Step 48, a VTC target valve timing upper limit value VTCLIM and a VEL target valve lift amount upper limit value VELLIM are computed sequentially, in the same manner as at Step 4 and at Step 24.

At Step 49, the VTC target valve timing VTCTRG1 corrected at Step 45 and the VTC target valve timing upper limit value VTCLIM corrected at Step 47 are compared with each other, and the one set to the more retarded angle side (smaller advance angle amount side) is selected to be set as a final VTC target valve timing VTCTRG.

At Step 50, the VEL target valve lift amount VELTRG1 corrected at Step 45 and the VEL target valve lift amount upper limit value VELLIM corrected at Step 48 are compared with each other, and the one set to the lower lift amount side is selected to be set as a final VEL target valve lift amount VELTRG.

Namely, if, due to a control delay or the like, the actual VTC valve timing VTCNOW is set to the advance angle side relative to the corrected VTC target valve timing VTCTRG1 or the actual VEL valve lift amount VCS_IN is set to the high lift amount side relative to the VEL target valve lift amount VELTRG1, there is a possibility of interference between the intake valve and the piston. Such interference is prevented as above.

At Step 51, a VTC duty value VTCDTY is computed in the same manner as at Step 10 and at Step 11, and the computed VTC duty value VTCDTY is output as an output signal to drive the actuator of VTC 18.

At Step 52, a VEL duty value VELDTY is computed in the same manner as at Step 30 and at Step 31, and the computed VEL duty value VELDTY is output as an output signal to drive electrically operated motor 45 of VEL 16 and control is ended.

In the third embodiment, although the control is complicated, each limit amount of the valve timing and the valve lift amount can be reduced. Thus, the control suitable as much as possible for the requirement of engine operating condition can be performed.

In the above embodiments, the case where the VTC and the VET are disposed only to the intake valve side has been described. However, the present invention can be also applied to an engine in which the VTC and the VEL are disposed to the exhaust valve side, and there is a possibility of interference between the exhaust valve and the piston, if the retarded angle amount of valve timing of the exhaust valve is set to be large, and also the valve lift amount is set to the high lift amount side. In this case, the control can be executed by replacing the advance angle amount of the valve timing of the intake valve for the retarded angle amount of the valve timing of the exhaust valve.

Further, in the above embodiments, electrically operated actuator 36 has been used as a driving device of the VEL. However, instead of the electrically operated actuator, an oil pressure actuator may be used as a driving device. Moreover, an electrically operated VTC may be used in place of the oil operated VTC, as the VEL.

As a variable device of valve lift amount, the VEL that successively performs the variable control of the valve lift amount and the operating angle has been used. However, the constitution may be such that the valve lift amount is variably controlled in several steps.

The entire contents of Japanese Patent Application No. 2001-090972 filed on Mar. 27, 2001, a priority of which is claimed, are incorporated herein by reference.

What is claimed is:

1. An apparatus for controlling a variable valve operating mechanism that performs a valve timing control and a valve lift amount control of at least one of an intake valve and an exhaust valve comprising:

a computing section that sets target values of valve timing and a valve lift amount in accordance with an engine operating condition, sets a limit value for limiting a control range of the valve lift amount in accordance with a control state of the valve timing, and limits the target value of the control for the valve lift amount in accordance with said engine operating condition, by the limit value in accordance with said control state of the valve timing; and a controlling section that controls said valve timing and valve lift amount, based on the target values set finally by said computing section.

2. An apparatus for controlling a variable valve operating mechanism according to claim 1, wherein said computing section sets the limit value of the valve lift amount to a lower lift amount side as the valve timing of the intake valve is controlled to an advance angle side, and wherein the limit value for limiting the control range of the control for the one of the valve timing and the valve lift amount is set at a particular instant in time in accordance with the change in the control state of the other of the valve timing and the valve lift amount, irrespective as to an valve lift amount and an actual valve timing value corresponding to the control state.

3. An apparatus for controlling a variable valve operating mechanism according to claim 1, wherein said computing section sets the limit value of the valve lift amount to a lower lift amount side as the valve timing of the exhaust valve is controlled to a retarded angle side.

4. An apparatus for controlling a variable valve operating mechanism according to claim 1, wherein, when a target valve lift amount of the intake valve or the exhaust valve to be set in accordance with said engine operating condition, is set to be larger than said limit value, said computing section sets the target valve lift amount as said limit value.

5. A method for controlling a variable valve operating mechanism that performs a valve timing control and a valve lift amount control of at least one of an intake valve and an exhaust valve, the method comprising:

setting target values of valve timing and a valve lift amount in accordance with an engine operating condition, setting a limit value for limiting a control range of a control for the valve lift amount in accordance with a control state of the valve timing, limiting the target value of the control for the valve lift amount set in accordance with said engine operating condition by the limit value in accordance with a control state of the valve timing, and controlling said valve timing and valve lift amount based on the finally set respective target values.

6. A method for controlling a variable valve operating mechanism according to claim 5, wherein the limit value is set to limit the valve lift amount to a lower lift amount side as the valve timing of the intake valve is controlled to an advance angle side.

7. A method for controlling a variable valve operating mechanism according to claim 6, wherein, when a target valve lift amount of the intake valve or the exhaust valve to be set in accordance with said engine operating condition, is set to be larger than said limit value, the target valve lift amount is set as said limit value.

8. A method for controlling a variable valve operating mechanism according to claim 5, wherein the limit value is set to limit the valve lift amount to a lower lift amount side as the valve timing of the exhaust valve is controlled to a retarded angle side, and wherein the limit value for limiting the control range of the control for the valve lift amount is set at a particular instant in time in accordance with the change in the control state of the valve timing, irrespective as to an actual valve timing value corresponding to the control state.

9. A method for controlling a variable valve operating mechanism according to claim 5,
wherein a limit value is set to limit only a control range of the valve timing in accordance with a control state of the valve lift amount.

10. A method for controlling a variable valve operating mechanism according to claim 9,
wherein the limit value is set to limit the valve timing to a retarded angle side as the valve lift amount of the intake valve is controlled to a large amount side.

11. A method for controlling a variable valve operating mechanism according to claim 9,
wherein the limit value is set to limit the valve timing to an advance angle side as the valve lift amount of the exhaust valve is controlled to a large amount side.

12. A method for controlling a variable valve operating mechanism according to claim 9,
wherein, when target valve timing of the intake valve is set to an advance angle side exceeding said limit value or when target valve timing of the exhaust valve is set to a retarded angle side exceeding said limit value, each target valve timing is set as the limit value.

13. An apparatus for controlling a variable valve operating mechanism that performs a valve timing control and a valve lift amount control of at least one of an intake valve and an exhaust valve, comprising:
a computing section that sets target values of valve timing and a valve lift amount in accordance with an engine operating condition, sets a limit value for limiting a control range of the valve lift amount in accordance with a control state of the valve timing, and limits the target value of the control for the valve lift amount in accordance with said engine operating condition, by the limit value in accordance with said control state of the valve timing, and also sets a limit value for limiting a control range of the valve timing in accordance with a control state of the valve lift amount, and limits the target value of the control for the valve timing in accordance with said engine operating condition, by the limit value in accordance with said control state of the valve lift amount; and
a controlling section that controls said valve timing and valve lift amount, based on the target values set finally by said computing section.

14. An apparatus for controlling a variable valve operating mechanism according to claim 13,
wherein said computing section sets, as said limit value, a correction coefficient for limiting the target valve timing and the target valve lift amount in a predetermined region based on the target valve timing and the target valve lift amount set based on the engine operating condition, and corrects the target valve timing and the target valve lift amount with said correction coefficient.

15. An apparatus for controlling a variable valve operating mechanism that performs a valve timing control and a valve lift amount control of at least one of an intake valve and an exhaust valve, so that valve timing and a valve lift amount are successively varied, respectively, comprising:
a computing section that sets target values for successively varying the valve timing and the valve lift amount in accordance with an engine operating condition, sets a limit value for limiting a control range of a control for one of the valve timing and the valve lift amount, as a successively varying value, in accordance with a change in a control state of the other of the valve timing and the valve lift amount, and limits the target value of the control for the one of the valve timing and the valve lift amount in accordance with said engine operating condition, by the limit value in accordance with said control state of the other of the valve timing and the valve lift amount; and
a controlling section that controls said valve timing and valve lift amount, based on the target values set finally by said computing section.

16. An apparatus for controlling a variable valve operating mechanism according to claim 15,
wherein said computing section sets a limit value for limiting only a control range of the valve timing in accordance with a control state of the valve lift amount.

17. An apparatus for controlling a variable valve operating mechanism according to claim 16,
wherein said computing section sets the limit value of the valve timing to a retarded angle side as the valve lift amount of the intake valve is controlled to a large amount side.

18. An apparatus for controlling a variable valve operating mechanism according to claim 16,
wherein said computing section sets the limit value of the valve timing to an advance angle side as the valve lift amount of the exhaust valve is controlled to a large amount side.

19. An apparatus for controlling a variable valve operating mechanism according to claim 16,
wherein, when target valve timing of the intake valve is set to an advance angle side exceeding said limit value or when target valve timing of the exhaust valve is set to a retarded angle side exceeding said limit value, said computing section sets each target valve timing as the limit value.

20. An apparatus for controlling a variable valve operating mechanism that performs a valve timing control and a valve lift amount control of at least one of an intake valve and an exhaust valve, so that valve timing and a valve lift amount are successively varied, respectively, comprising:
target value setting means for setting target values for successively varying the valve timing and the valve lift amount in accordance with an engine operating condition;
limit value setting means for setting a limit value for limiting a control range of a control for one of the valve timing and the valve lift amount, as a successively varying value, in accordance with a change in a control state of the other of the valve timing and the valve lift amount;
target value limiting means for limiting the target value of the control for the one of the valve timing and the valve lift amount set by said target value setting means in accordance with said engine operating condition, by the limit value in accordance with said control state of the other of the valve timing and the valve lift amount set by said limit value setting means; and
control means for controlling said valve timing and valve lift amount, based on the target values set by said target value setting means and then limited by said target value limiting means.

21. A method for controlling a variable valve operating mechanism that performs a valve timing control and a valve lift amount control of at least one of an intake valve and an exhaust valve, so that valve timing and a valve lift amount are successively varied, respectively, the method comprising:

setting target values for successively varying the valve timing and the valve lift amount in accordance with an engine operating condition, setting a limit value for limiting a control range of a control for one of the valve timing and the valve lift amount, as a successively varying value, in accordance with a change in a control state of the other of the valve timing and the valve lift amount, limiting the target value of the control for the one of the valve timing and the valve lift amount set in accordance with said engine operating condition by the limit value in accordance with said control state of the other of the valve timing and the valve lift amount, and controlling said valve timing and valve lift amount based on the finally set respective target values.

22. A method for controlling a variable valve operating mechanism that performs a valve timing control and a valve lift amount control of at least one of an intake valve and an exhaust valve, the method comprising:

setting target values of valve timing and a valve lift amount in accordance with an engine operating condition, setting a limit value for limiting a control range of a control for the valve lift amount in accordance with a control state of the valve timing, limiting the target value of the control for the valve lift amount set in accordance with said engine operating condition by the limit value in accordance with said control state of the valve timing, setting a limit value for limiting a control range of a control for the valve timing in accordance with a control state of the valve lift amount, wherein the target value of the control for the valve timing set in accordance with said engine operating condition is limited by the limit value in accordance with said control state of the valve lift amount, and controlling said valve timing and valve lift amount based on the finally set respective target values.

* * * * *